United States Patent [19]
Ono

[11] Patent Number: 4,696,572
[45] Date of Patent: Sep. 29, 1987

[54] SURFACE INSPECTION APPARATUS

[75] Inventor: Akira Ono, Tokyo, Japan

[73] Assignee: Kabushiki Kaisha Toshiba, Kawasaki, Japan

[21] Appl. No.: 702,636

[22] Filed: Feb. 19, 1985

[51] Int. Cl.[4] ............................................. G01B 9/021
[52] U.S. Cl. .................................... 356/348; 356/360
[58] Field of Search ................ 356/347, 348, 359, 360

[56] References Cited

U.S. PATENT DOCUMENTS 3,642,374  2/1972  Matsumoto et al. ................ 356/347

OTHER PUBLICATIONS

Snow et al. "On Using Holograms for Test Glasses", *Applied Optics* vol. 9, No. 4, pp. 822–827, 4/70.
Birch et al. "The Application of Computer-generated Holograms to Testing Optical Elements", *J. Phys. D. Appl. Phys.*, vol. 5, pp. 1982–1992, 11/72.
Larionov et al., "Holographic Inspection of Aspherical Surfaces", *Sov. J. Opt. Technol.*, vol. 46, pp. 229–231, 4/79.
Wyant et al., "Using Computer Generated Holograms to Test Aspheric Wavefronts", *Applied Optics*, vol. 11, No. 12, pp. 2833–2839, 12/72.
Ichioka et al., "Interferometric Testing of Large Optical Components with Circular Computer Holograms", *Applied Optics*, vol. 11, No. 11, pp. 2597–2602, 11/72.
Yatagai et al., "Interferometric Testing with Computer-generated Holograms: Aberration Balancing Method and Error Analysis", *Applied Optics*, vol. 17, No. 4, pp. 558–565, 2/78.

*Primary Examiner*—Davis L. Willis
*Assistant Examiner*—Matthew W. Koren
*Attorney, Agent, or Firm*—Cushman, Darby & Cushman

[57] ABSTRACT

A surface inspection apparatus for inspecting the condition of a nonspherical subject surface includes a laser generator and a computer hologram. The laser beam emitted from the laser generator is divided by a light dividing unit into an object light directed toward the subject surface and a reference light directed toward the hologram. The object light is applied to the subject surface and then projected onto the hologram. The zeroth-order diffracted rays of the reference light passed through the hologram and the negative first-order diffracted rays of the object light passed through the hologram are caused to interface with each other, thereby producing interference fringes.

33 Claims, 10 Drawing Figures

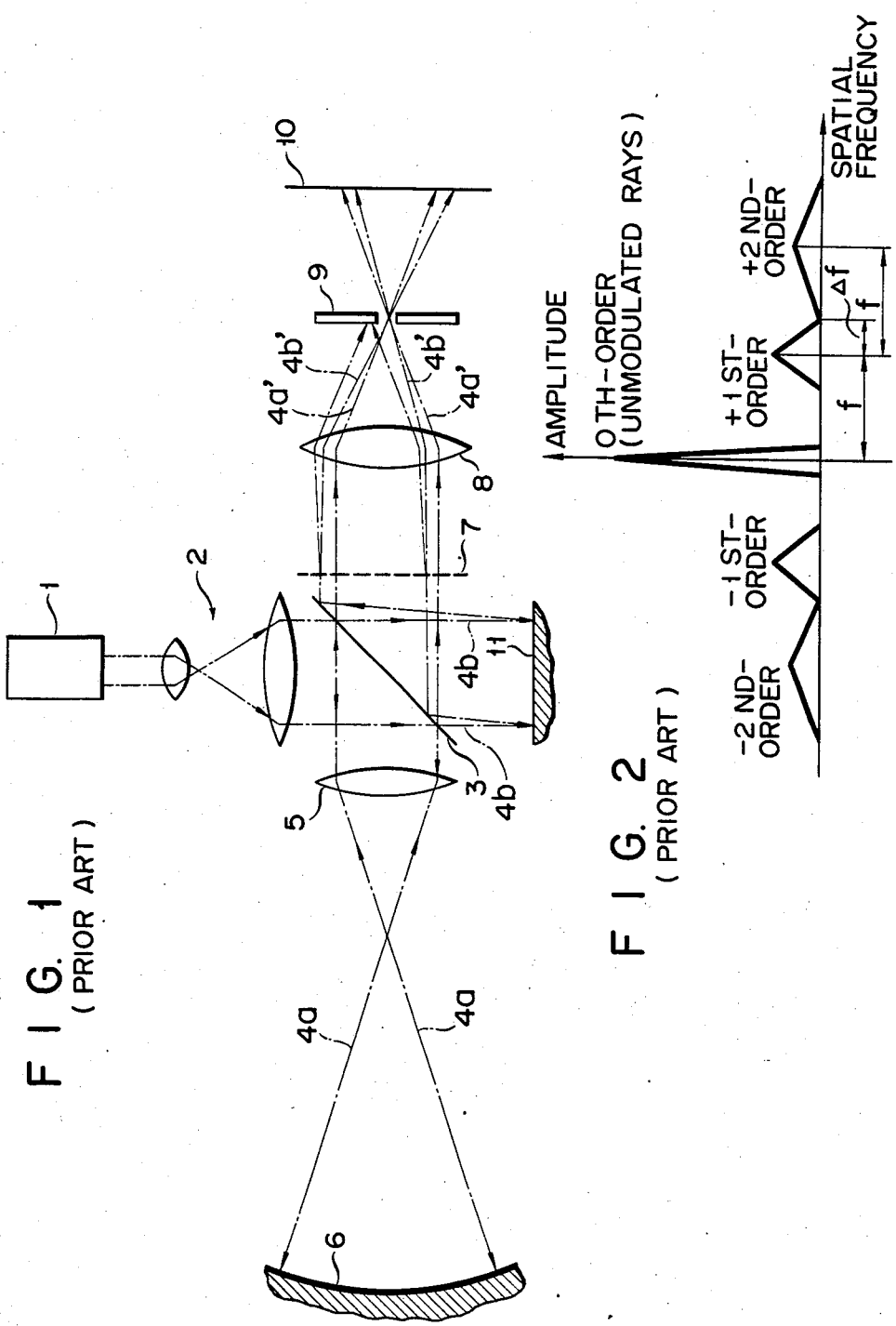

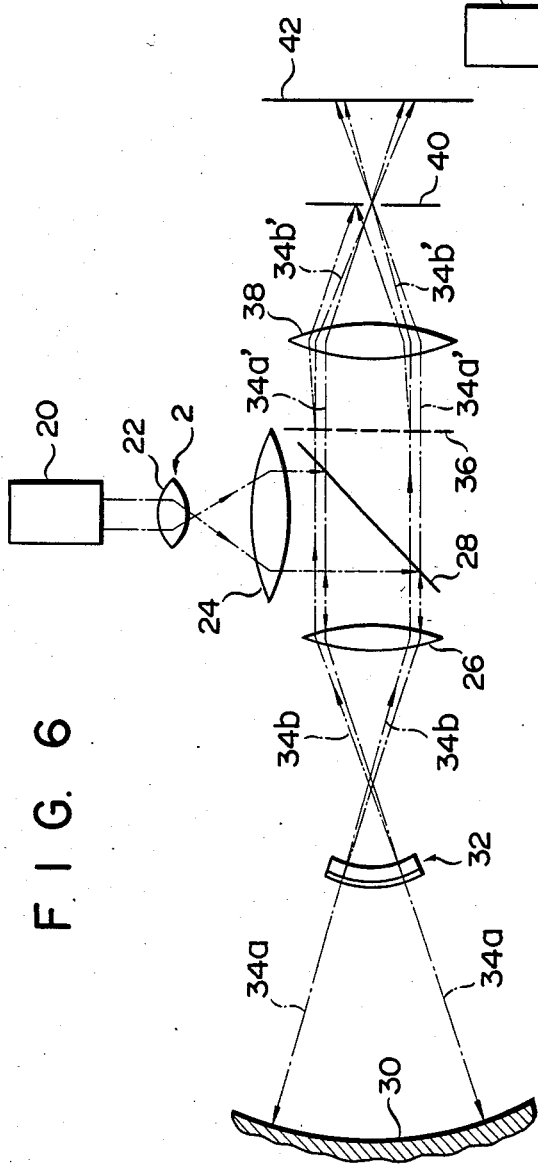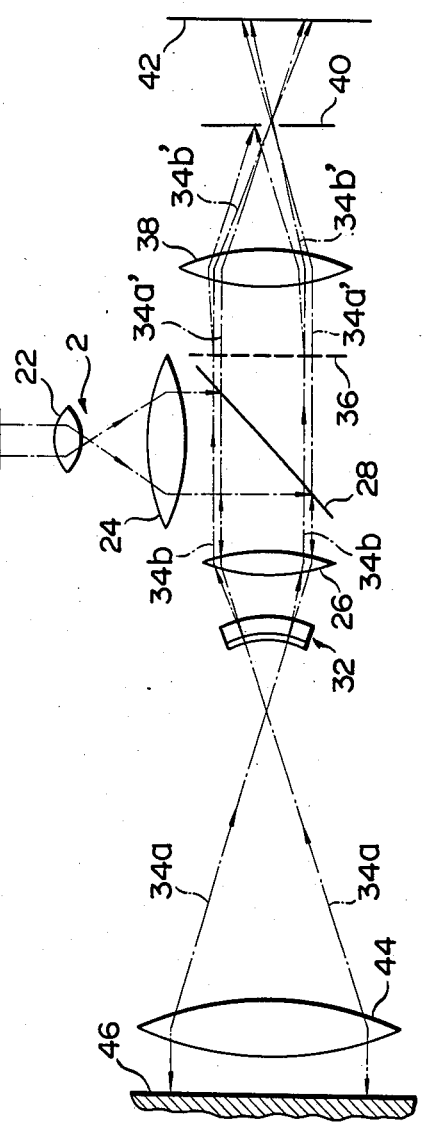

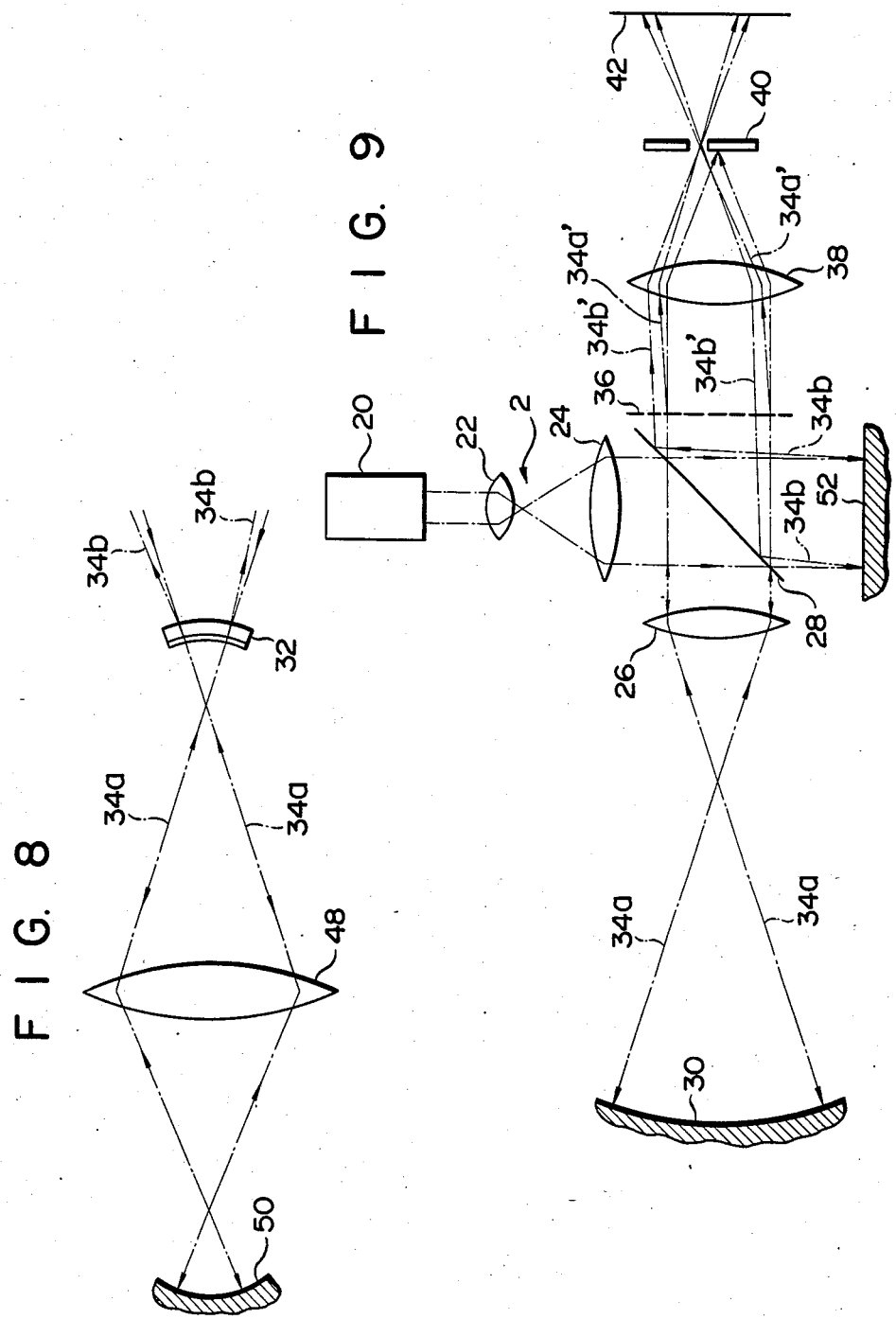

SURFACE INSPECTION APPARATUS

BACKGROUND OF THE INVENTION

The present invention relates to a surface inspection apparatus for inspecting an aspherical body of an optical system, such as a convex lens, concave lens, etc., for surface profile condition by the hologram interference process.

Conventional inspection apparatuses of this type are known which use an interferometer e.g., a Twyman Green interferometer. FIG. 1 shows one such prior art apparatus. In this inspection apparatus, a laser beam emitted from a laser generator 1 is diverged and collimated by a magnifying optical system 2, and then projected onto a translucent mirror 3, where it is divided into an object light 4a and a reference light 4b. The object light 4a is applied to an aspherical surface 6 as a subject surface to be inspected through an irradiation lens 5. The object light 4a reflected by the nonspherical surface 6 is passed through the irradiation lens 5 and the translucent mirror 3, and then projected onto a computer hologram 7. Out of the diffracted rays of the object light 4a which has passed through the hologram 7, zeroth-order diffracted rays or unmodulated transmitted rays $4a'$ are converged by a converging lens 8, passed through a spatial frequency filter 9 with an orifice, and projected onto a screen 10 to form an image. The reference light 4b is reflected by a reflector 11, and then further reflected by the translucent mirror 3 to be passed through the computer hologram 7. Out of the diffracted rays of the reference light 4b which has passed through the hologram 7, positive first-order diffracted rays $4b'$ are converged by the converging lens 8, passed through the spatial frequency filter 9, and projected onto the screen 10 to form an image thereon. Other diffracted rays of the object and reference lights passed through the hologram 7 are filtered out by the filter 9.

In the inspection apparatus constructed in this manner, the unmodulated transmitted rays $4a'$ of the object light 4a which have passed through the computer hologram 7 interfere with the positive first-order diffracted rays $4b'$ of the reference light 4b selected by the filter 9 at the outlet side thereof, and interference fringes are projected on the screen 10. If the unmodulated transmitted rays $4a'$ and the positive first-order diffracted rays $4b'$ are equal in phase (i.e., if the subject surface 6 is an ideal surface free from distortion), then the interference fringes will be straight by adjusting the optical axis and the focal position of each lens. If the subject surface 6 is distorted, the object light 4a, after being projected onto the subject surface 6, is reflected in a slightly different direction from its course of incidence, and interferes with the positive first-order diffracted rays $4b'$ of the reference light 4b. As a result curved portions appear in the interference fringes. Thus, the surface condition or the finishing accuracy of the subject surface 6 can be judged from the bend of the interference fringes.

In such a prior art inspection apparatus, however, the intensity of the diffracted rays $4b'$ of the reference light 4b is lower than that of the transmitted rays $4a'$ of the object light 4a, causing an imbalance between the rays. Thus, the interference fringes obtained are blurred, and it is hard to accomplish a high-accuracy inspection.

In the conventional inspection apparatus, moreover, the positive first-order diffracted rays of the reference light transmitted through the hologram are selected by the filter 9. As shown in FIG. 2, however, the space frequency distribution of the reference light transmitted through the hologram is such that positive first- and second-order diffracted rays are located very close to each other. In order to extract only the positive first-order diffracted rays with high accuracy, it is necessary to make the spatial frequency f of a carrier wave sufficiently high. If the maximum frequency bandwidth of the transmitted rays $4a'$ of the object light is $\Delta f$, the space frequency f of the carrier wave in the inspection apparatus must satisfy a relation $f > 3\Delta f$. If the spatial frequency of the carrier wave is made higher, however, the number of curves described on the computer hologram increases correspondingly. Thus, the manufacture of the computer hologram becomes elaborate, resulting in an increase in the manufacturing cost of the inspection apparatus. Also, it is hard to manufacture the computer hologram with high accuracy, and the inspection accuracy is lowered.

SUMMARY OF THE INVENTION

The present invention is contrived in consideration of the above circumstances, and is intended to provide a surface inspection apparatus which is capable of high-accuracy inspection of aspherical surfaces and yet low in manufacturing cost.

The inventor hereof took notice of the fact that the bandwidth of negative first-order diffracted rays, among other rays of object light transmitted through a hologram, is narrow. In an inspection apparatus according to the present invention, the negative first-order diffracted rays are caused to interfere with unmodulated transmitted rays of a reference light transmitted through the hologram. Since the bandwidth of the negative first-order diffracted rays are narrow, as aforesaid, the negative first-order diffracted rays can accurately be selected even with use of a low spatial frequency for the carrier wave, facilitating the manufacture of the computer hologram. According to the inspection apparatus of the present invention moreover, the difference in intensity between the unmodulated transmitted rays of the reference light and the negative first-order diffracted rays of the object light is reduced. This diminishes the imbalance between them by adjusting the intensity of reflection of the reference light.

BRIEF DESCRIPTION OF THE DRAWINGS

FIGS. 1 and 2 show a prior art inspection apparatus, in which FIG. 1 is a side view showing an optical system of the apparatus, and FIG. 2 is a diagram illustrating the space frequency distribution after the passage of a reference light through a hologram in the apparatus;

FIGS. 3 to 5 show an inspection apparatus according to one embodiment of the present invention, in which FIG. 3 is a side view showing an optical system of the apparatus, FIG. 4 is a diagram showing an example of interference fringes, and FIG. 5 is a diagram illustrating the spatial frequency distribution after the passage of an object light through a hologram in the apparatus;

FIGS. 6 to 8 show various modifications of the present invention; and

FIGS. 9 and 10 are side views showing optical systems used in inspection apparatuses according to the second and third embodiments of the invention, respectively.

DETAILED DESCRIPTION OF THE PREFERRED EMBODIMENTS

Preferred embodiments of the present invention will now be described in detail with reference to the accompanying drawings.

Figure 3:
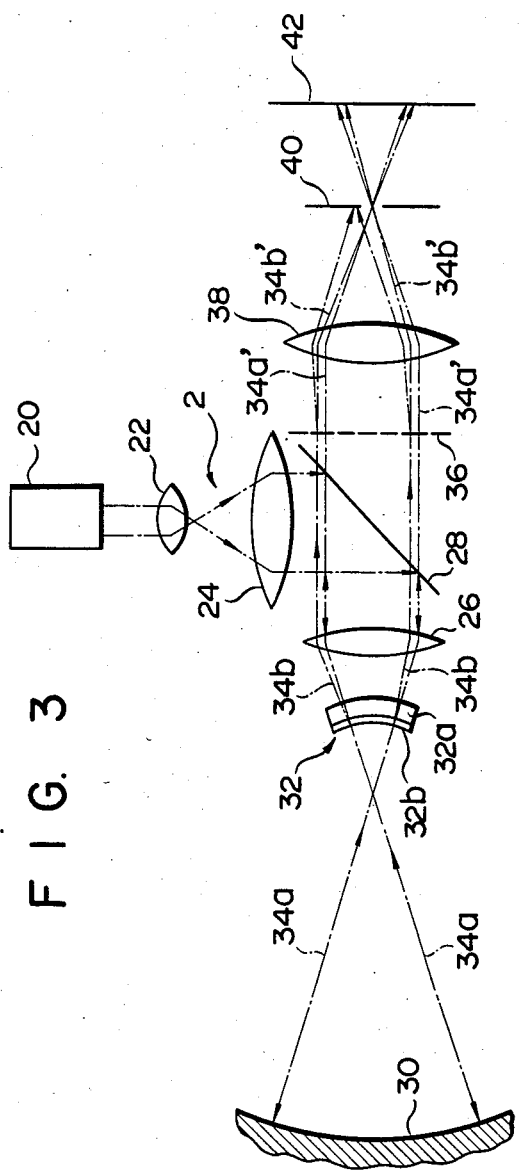

As shown in FIG. 3, a surface inspection apparatus according to one embodiment of the present invention comprises a laser generator 20, a diffusion lens 22 for diverging a laser beam emitted from the laser oscillator 20, and a collimator lens 24 for collimating the diverged laser beam. The inspection apparatus also comprises a translucent mirror 28 which reflects part of the laser beam transmitted through the collimator lens 24 and leads it to an irradiation lens 26. The irradiation lens 26 applies the laser beam to a concave aspherical surface 30 as a subject surface to be inspected at right angles thereto. A reference translucent mirror 32 is interposed between the subject surface 30 and the irradiation lens 26. The reference translucent mirror 32 is formed of a lens 32a having a convex spherical surface facing the irradiation lens 26 and a concave spherical surface facing the subject surface 30, and a translucent mirror surface 32b pasted on the concave spherical surface of the lens 32a. The translecent mirror surface 32b transmits a part of the laser beam projected from the irradiation lens 26 as an object light 34a, and reflects the remaining as a reference light 34b. Thus, the translucent mirror 28 and the reference translucent mirror 32 constitute light dividing means in the present invention.

Further, the inspection apparatus comprises a computer hologram 36 and a convergent lens 38 which are arranged on the opposite side of the translucent mirror 28 to the irradiation lens 26. A spatial frequency filter 40 is disposed near the focus of the convergent lens 38. The filter 40 selectively allows the passage of diffracted rays which are passed through the computer hologram 36 and the convergent lens 38, and causes them to interfere with one another. Observing means such as a screen 42 is opposed to the filter 40 so that interference fringes of the interfering diffracted rays are projected onto the screen 42.

In the inspection apparatus constructed in this manner, the laser beam emitted from the laser oscillator 20 is diverged by the lens 22, collimated by the collimator lens 24, and then projected onto the translucent mirror 28. About one-half of the laser beam is reflected by the translucent mirror 28, converged by the irradiation lens 26, and then projected onto the reference translucent mirror 32. The laser beam incident on the reference translucent mirror 32 is divided by the translucent mirror surface 32b into two parts, the object light 34a transmitted through the translucent mirror surface 32b and directed toward the subject surface 30 and the reference light 34b reflected by the translucent mirror surface 32b. The object light 34a applied to the subject surface 30 is reflected in directions corresponding to the condition or configuration of the subject surface 30. Hereupon, the subject surface 30 is disposed at right angles to the optical axis of the object light 34a. The reflected object light 34a is transmitted through the reference translucent mirror 32, the irradiation lens 26, and the translucent mirror 28, and then projected onto the computer hologram 36.

Like the reflected object light 34a, the reference light 34b is transmitted through the irradiation lens 26 and the translucent mirror 28, and then projected onto the computer hologram 36.

Negative first-order diffracted rays 34a′, out of the diffracted rays of the object light 34a which has passed through the hologram 36, are selectively passed through an orifice of the spatial frequency filter 40, and zeroth-order diffracted rays not modulated by the hologram 36 or unmodulated transmitted rays 34b′, out of the reference light 34b transmitted through the hologram 36, are selectively passed through the orifice of the filter 40. The diffracted rays 34a′ and 34b′ interfere with each other after passing through the space frequency filter 40, and their interference fringes are projected onto the screen 42. The selection between the negative first-order diffracted rays and the zeroth-order diffracted rays (by the space frequency filter 40) is achieved by adjusting the angle of reflection of the translucent mirror surface 32b of the reference translucent mirror 32 and the position of the filter 40.

Figure 4:
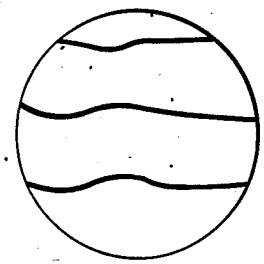

The aforesaid interference occurs because of the following reason. The object light 34a is modulated when it is reflected by the subject surface 30, and is modulated again in the same manner when it passes through the computer hologram 36. As a result, the negative first-order rays, out of the diffracted rays of the object light which has passed through the hologram 36, become equivalent to rays whose modulation are cancelled. The computer hologram 36 is so designed that the interference fringes of the negative first-order diffracted rays of the object light and the zeroth-order diffracted rays of the reference light provide a specific pattern, e.g., a straight-fringe pattern, if the subject surface 30 is an ideal surface free from distortion. Accordingly, when the subject surface 30 is distorted and the unmodulated negative first-order diffracted rays 34a′ doubly modulated by the subject surface 30 and the computer hologram 36 are caused to interfere with the unmodulated transmitted rays 34b′ of the reference light, curved fringes appear on the screen 42, as shown in FIG. 4. The condition of the subject surface 30 can be judged from the bend of the fringes.

The intensity of the negative first-order diffracted rays 34a′ of the object light 34a is lower than that of the unmodulated transmitted rays 34b′ of the reference light 34b. If these diffracted rays are unbalanced in light intensity, the interference fringes projected onto the screen 42 are not clear. In this embodiment, however, the reflectivity of the translucent mirror surface 32b of the reference translucent mirror 32 is so low that the intensity of the unmodulated transmitted rays 34b′ of the reference light 34b is at about the same level as that of the negative first-order diffracted rays 34a′ of the object light 34a. Thus, the intensity of the reference light is lowered. Hereupon, if the negative first-order diffraction efficiency of the computer hologram 36, the transmission factor of the computer hologram 36, the reflectivity of the subject surface 30, and the absorption efficiency of the translucent mirror surface 32b are K, T, r and a, respectively, the reflectivity R of the translucent mirror surface 32b is given by $$R = (1-a) + \frac{\frac{T}{rK} - \sqrt{\frac{4T(1-a)}{rK} + \left(\frac{T}{rK}\right)^2}}{2}.$$

When the diffraction efficiency of the computer hologram 36 is low, the adjustment of the reflectivity R of the translucent mirror surface 32b can be achieved by, for example, forming the translucent mirror surface 32b from glass having no coating, in place of a mirror.

Figure 5:
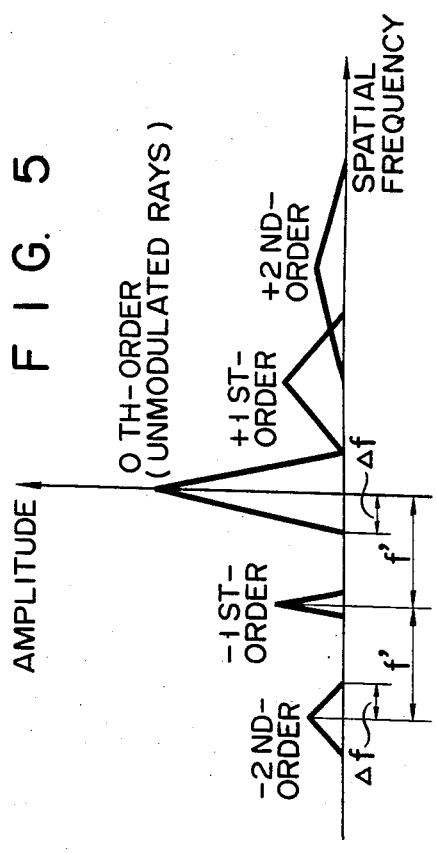

FIG. 5 shows an example of a spatial frequency distribution of the object light doubly modulated by the subject surface 30 and the computer hologram 36. As seen from FIG. 5, the space frequency bandwidth of the negative first-order diffracted rays is narrow, and that of the negative second-order diffracted rays adjoining the negative first-order diffracted rays is Δf, so that the two diffracted rays are fully spaced apart from each other. Therefore, even if the space frequency of a carrier wave is low, the negative first-order diffracted rays can securely be selected without overlapping the adjacent diffracted rays. For example, the space frequency f of the carrier wave need only be greater than the space frequency bandwidth Δf, that is, about one-third that of the prior art case shown in FIG. 2. Accordingly, the number of curves to be described on the computer hologram need only be about one-half that of the prior art apparatus. Thus, the computer hologram can be manufactured with high accuracy and at low cost.

According to the present embodiment, as described above in detail, interference fringes corresponding to the subject surface are produced by causing the negative first-order diffracted rays of the object light and the unmodulated transmitted rays of the reference light to interfere with each other. As a result, desired diffracted rays can be extracted with high accuracy even using a low space frequency for the carrier wave, so that the computer hologram can easily be manufactured at low cost. Further, by adjusting the intensity of reflection of the translucent mirror surface of the reference translucent mirror, the difference in light intensity between the zeroth-order diffracted rays of the reference light and the negative first-order diffracted rays of the object light are reduced to diminish the imbalance between the two rays. Thus, clear interference fringes can be obtained for higher inspection accuracy.

In this embodiment, moreover, the reference light and object light reach the screen 42 through the same members, except for the subject surface, that is, through the same optical path. Therefore, even if the irradiation lens 26, the translucent mirror 28 or other member is subject to distortion, the reference light and object light are almost equally influenced by the members without substantially changing their mutual relation. Accordingly, if these lights are caused to interfere with each other, the influences of the distortion of the irradiation lens, the translucent mirror or the like on the lights are cancelled, and only curves corresponding to the distortion of the subject surface appear in the interferences fringes projected onto the screen 42. Thus, the surface inspection can be accomplished with high accuracy without being substantially influenced by variations in the manufacturing accuracy of the optical system. Since the need for accuracy in the optical system can be reduced, it is unnecessary to use a high-accuracy optical system for the irradiation lens, translucent mirror or other member. Thus, the manufacturing cost of the inspection apparatus can be lowered.

It is to be understood that the present invention is not limited to the embodiment described above, and that various changes and modifications may be effected therein by one skilled in the art without departing from the scope or spirit of the invention. In the above embodiment, for example, the zeroth-order diffracted rays of the reference light and the negative first-order diffracted rays of the object light are caused to interfere with each other. Alternatively, however, if the computer hologram is so designed that the positive first-order diffracted rays of the object light have the same wave front as the zeroth-order diffracted rays of the reference light, the zeroth-order diffracted rays of the reference light may be caused to interfere with positive first-order diffracted rays of the object light. Namely, in this invention, the computer hologram can provide the same function and effect of the above embodiment only if it is so designed that the zeroth-order diffracted rays of the reference light and the ±1th-order diffracted rays of the object light are caused to interfere with each other. The observing means is not limited to the screen 42, but may be a camera, for example.

In the above embodiment, moreover, the reference translucent mirror 32 is located on the side of the translucent mirror 28 with respect to the focus of the irradiation lens 26. Alternatively, however, it may be located on the side of the subject surface 30 with respect to the focus of the irradiation lens 26, as shown in FIG. 6. If the accuracy of the irradiation lens 26 is high, the reference translucent mirror 32 may be interposed between the irradiation lens 26 and the translucent mirror 28. In this case, the translucent mirror surface 32b of the reference translucent mirror 32 is formed flat.

In the above embodiment, a concave mirror is used for the subject surface. As shown in FIG. 7, however, a convex lens 44 may be used as a subject to be inspected for surface condition. In this case, an auxiliary mirror 46 with high surface accuracy is disposed behind the convex lens 44 so that the object light transmitted through the convex lens 44 is reflected by the auxiliary mirror 46. When inspecting an aspherical lens with a great diameter, it is only necessary that a spherical mirror 50 as an axuiliary mirror be disposed behind the lens 48, as shown in FIG. 8. In FIG. 7, moreover, an optical system consisting of a plurality of lenses may be arranged in place of the convex lens 44 so that the optical system can be checked for wave front aberration.

Also, the inspection apparatus of the present invention may be constructed by the use of Twyman interferometer, as shown in FIG. 9. In FIG. 9, like reference numerals are used to designate like portions as shown in FIG. 3, and a description of those portions is omitted. In this embodiment, a reflecting surface 52 is provided in place of the reference translucent mirror. As in the first embodiment, the reflectivity R' of the reflecting surface 52 is given by R'=(rK/T).

Figure 10:
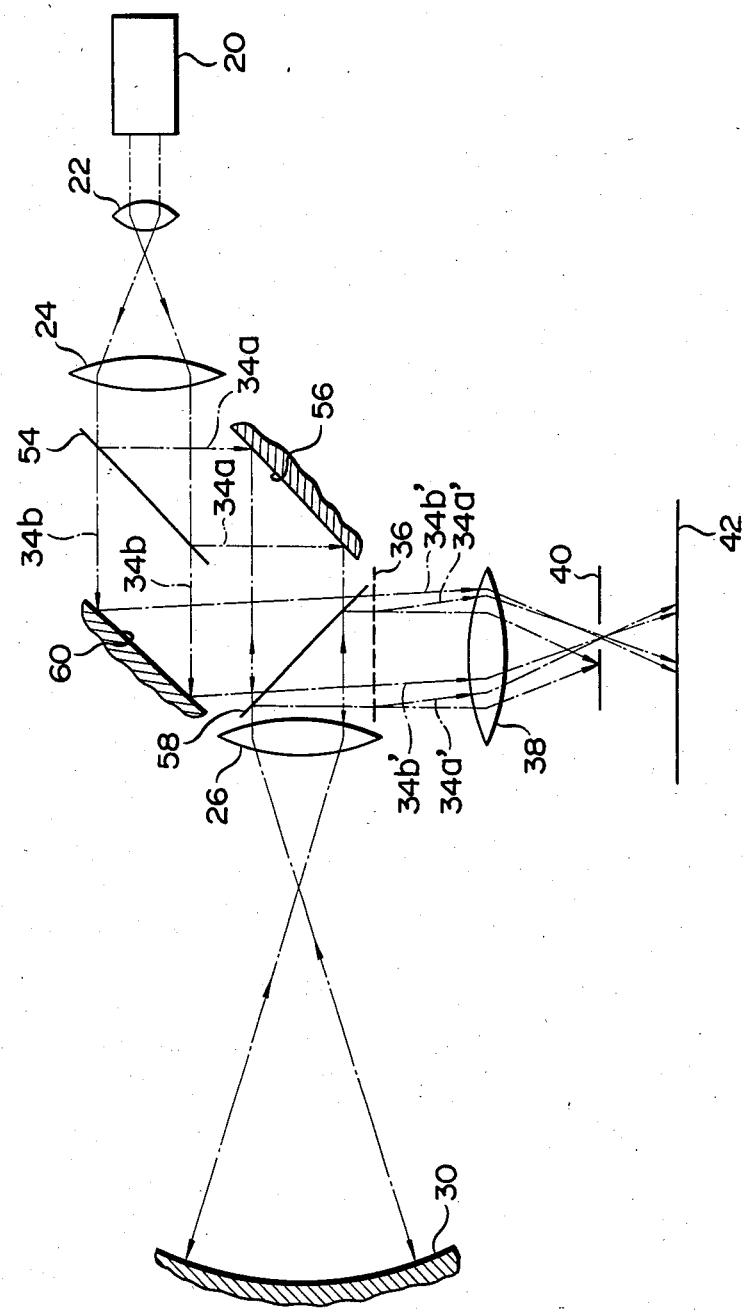

The inspection apparatus of the present invention may be constructed by the use of an interferometer of a type, as shown in FIG. 10. In FIG. 10, like reference numerals are used to designate like members as shown in FIG. 3, and a description of those members is omitted. In this inspection apparatus, a laser beam emitted from a laser oscillator 20 is diverged and collimated by lenses 22 and 24, respectively, and then divided into an object light 34a and a reference light 34b by a translucent mirror 54. The object light 34a is reflected by a reflector 56, and transmitted through a translucent mirror 58 and an irradiation lens 26 to be projected onto a subject surface 30 at right angles thereto. The object light 34a reflected by the subject surface 30 is transmitted through the irradiation lens 26, reflected by the translucent mirror 58, and then passed through a computer hologram 36. Out of the diffracted rays of the object light 34a which has passed through the hologram 36, negative first-order diffracted rays 34a' are converged by an convergent lens 38, and selectively passed through a space frequency filter 40. On the other hand, the reference light 34b is reflected by a reflector 60, and then transmitted through the translucent mirror 58 to be projected onto the computer hologram 36. Out of the diffracted rays of the reference light 34b which has passed through the hologram 36, unmodulated transmitted rays 34b' are converged by the convergent lens 38, and selectively passed through the space frequency filter 40. As a result, the negative first-order diffracted rays 34a' and the unmodulated transmitted rays 34b' interfere with each other, and interference fringes are projected onto a screen 42.

Hereupon, the angle of reflection of the reflector 60 is adjusted so that the unmodulated transmitted rays 34b' of the reference light 34b are passed through an orifice in the space frequency filter 40. Also, the reflectivity of the reflector 60 is small so that the intensity of the unmodulated transmitted rays 34b' of the reference light 34b is almost equal to that of the negative first-order diffracted rays 34a' of the object light 34a. For example, the reflector 60 is formed from a partial reflector.

In the inspection apparatus constructed in this manner, as in the first embodiment, it is possible to produce clear interference fringes for improved inspection accuracy. Also, the negative first-order diffracted rays can accurately be selected even with the use of a low spatial frequency for the carrier wave, so that the computer hologram can easily be manufactured at low cost.

What is claimed is:

1. A surface inspection apparatus for inspecting the condition of an aspherical subject surface, comprising:
   emitting means for emtting a parallel light beam;
   a carrier frequency hologram;
   light dividing means for dividing the light beam emitted from the emitting means into an object light directed toward the subject surface and a reference light directed toward the hologram;
   an optical system for applying the object light at right angles to the subject surface and directing the applied object light toward the hologram; and
   selecting means for selectively extracting zeroth-order diffracted rays of the reference light passed through the hologram and Nth-order diffracted rays of the object light passed through the hologram and causing the diffracted rays to interfere with each other,
   said hologram being designed so that the Nth-order diffracted rays of the object light have the same wave front as the zeroth-order diffracted rays of the reference light, and having a carrier frequency $f < 3 \cdot \Delta f$, where $\Delta f$ represents the maximum frequency bandwidth of the transmitted rays of the object light,
   wherein the condition of the subject surface is judged from interference fringes of the diffracted rays which are caused to interfere with each other.

2. The inspection apparatus according to claim 1, wherein said hologram is a computer hologram so designed that the negative or positive first diffracted rays of the object light have the same wave front as the zeroth-order diffracted rays of the reference light.

3. The inspection apparatus according to claim 1, wherein said selecting means includes a converging lens for converging the diffracted rays of the reference light and the object light passed through the hologram, and a space frequency filter disposed near the focus of the converging lens and permitting selective transmission of the zeroth-order diffracted rays of the reference light and the Nth-order diffracted rays of the object light.

4. The inspection apparatus according to claim 1, wherein said light dividing means includes a translucent mirror adapted to reflect about one-half of the light beam emitted from the emitting means as the object light toward the subject surface and to transmit the remaining light beam as the reference light, and a reflecting surface for reflecting the transmitted reference light toward the translucent mirror, the reference light reflected by the reflecting surface being reflected toward the hologram by the translucent mirror.

5. The inspection apparatus according to claim 1, wherein said emitted means includes a laser oscillator, a lens for diverging the laser beam emitted from the laser oscillator, and a collimator lens for collimating the diverged laser beam.

6. The inspection apparatus according to claim 1, wherein said light dividing means includes means for adjusting the intensity of the reference light and the object light so that the intensity of the zeroth-order diffracted rays of the reference light is substantially equal to that of the Nth-order diffracted rays of the object light.

7. The inpection apparatus according to claim 6, wherein said light dividing means includes a translucent mirror for reflecting the light beam emitted from the emitting means toward the subject surface, and a reference translucent mirror disposed between the translucent mirror and the subject surface and adapted to transmit about one-half of the light beam as an object light and to reflect the remaining half as a reference light toward the hologram.

8. The inspection apparatus according to claim 7, wherein said reference translucent mirror includes a translucent mirror surface facing the subject surface, said translucent mirror surface forming said adjusting means.

9. The inspection apparatus according to claim 8, wherein the reflectivity R of said translucent mirror surface is given by $$R = (1-a) + \frac{\frac{T}{rK} - \sqrt{\frac{4T(1-a)}{rK} + \left(\frac{T}{rK}\right)^2}}{2},$$

where K is the Nth-order diffraction efficiency of the hologram, T is the transmission factor of the hologram, r is the reflectivity of the subject surface, and a is the absorption efficiency of the translucent mirror surface.

10. The inspection apparatus according to claim 6, wherein said light dividing means includes a translucent mirror adapted to reflect about one-half of the light beam emitted from the emitting means as the object light toward the subject surface and to transmit the remaining light beam as the reference light, and a reflecting surface for reflecting the transmitted reference light toward the translucent mirror, the reference light reflected by the reflecting surface being reflected toward the hologram by the translucent mirror.

11. The inspection apparatus according to claim 10, wherein said reflecting surface constitutes said adjusting means, and the reflectivity R of the reflecting surface is given by $$R = (rK/T),$$

where K is the Nth-order diffraction efficiency of the hologram, T is the transmission factor of the hologram, and r is the reflectivity of the subject surface.

12. The inspection apparatus according to claim 1, which further comprises observing means for observing the interference fringes of the Nth-order diffracted rays of the object light and the zeroth-order diffracted rays of the reference light.

13. The inspection apparatus according to claim 12, wherein said observing means includes a screen disposed on the opposite side of the selecting means to the light dividing means.

14. A surface inspection apparatus for inspecting the condition of an aspherical subject surface, comprising:
   emitting means for emitting a parallel light beam;
   a hologram;
   light dividing means for dividing the light beam emitted from the emitting means into an object light directed toward the subject surface and a reference light directed toward the hologram, said light dividing means including a translucent mirror for reflecting the light beam emitted from the emitting means toward the subject surface, and a reference translucent mirror disposed between the translucent mirror and the subject surface and adapted to transmit about one-half of the light beam as an object light and to reflect the remaining half as a reference light toward the hologram;
   an optical system for applying the object light at right angles to the subject surface and directing the applied object light toward the hologram; and
   selecting means for selectively extracting zeroth-order diffracted rays of the reference light passed through the hologram and Nth-order diffracted rays of the object light passed through the hologram and causing the diffracted rays to interfere with each other,
   said hologram being designed so that the Nth-order diffracted rays of the object light have the same wave front as the zeroth-order diffracted rays of the reference light,
   wherein the condition of the subject surface is judged from interference fringes of the diffracted rays which are caused to interfere with each other.

15. The inspection apparatus according to claim 14, wherein said reference translucent mirror includes a translucent mirror surface facing the subject surface.

16. The inspection apparatus according to claim 14, wherein said optical system includes a convergent lens disposed between the translucent mirror and the reference translucent mirror and adapted to apply the light beam to the subject surface and to direct the light beam reflected by the subject surface toward the hologram.

17. The inspection apparatus according to claim 16, wherein said reference translucent mirror is located on the same side as the convergent lens with respect to the focus of the converging lens.

18. The inspection apparatus according to claim 16, wherein said reference translucent mirror is located on the same side as the subject surface with respect to the focus of the convergent lens.

19. The inspection apparatus according to claim 14, wherein said optical system includes a convergent lens disposed between the translucent mirror and the reference translucent mirror and adapted to apply the light beam to the subject surface, and a reflecting surface located on the opposite side of the subject surface to the convergent lens and adapted to reflect the light beam transmitted through the subject surface toward the hologram.

20. The inspection apparatus according to claim 14, wherein said light dividing means includes means for adjusting the intensity of the reference light and the object light so that the intensity of the zeroth-order diffracted rays of the reference light is substantially equal to that of the Nth-order diffracted rays of the object light.

21. The inspection apparatus according to claim 20, wherein said light dividing means includes a translucent mirror for reflecting the light beam emitted from the emitting means toward the subject surface, and a reference translucent mirror disposed between the translucent mirror and the subject surface and adapted to transmit about one-half of the light beam as an object light and to reflect the remaining half as a reference light toward the hologram.

22. The inspection apparatus according to claim 21, wherein said reference translucent mirror includes a translucent mirror surface facing the subject surface, said translucent mirror surface forming said adjusting means.

23. The inspection apparatus according to claim 22, wherein the reflectivity R of said translucent mirror surface is given by $$R = (1 - a) + \frac{\frac{T}{rK} - \sqrt{\frac{4T(1-a)}{rK} + \left(\frac{T}{rK}\right)^2}}{2},$$

where K is the Nth-order diffraction efficiency of the hologram, T is the transmission factor of the hologram, r is the reflectivity of the subject surface, and a is the absorption efficiency of the translucent mirror surface.

24. The inspection apparatus according to claim 20, wherein said light dividing means includes a translucent mirror adapted to reflect about one-half of the light beam emitted from the emitting means as the object light toward the subject surface and to transmit the remaining light beam as the reference light, and a reflecting surface for reflecting the transmitted reference light toward the translucent mirror, the reference light reflected by the reflecting surface being reflected toward the hologram by the translucent mirror.

25. The inspection apparatus according to claim 10, wherein said reflecting surface constitutes said adjusting means, and the reflectivity R of the reflecting surface is given by $$R = (rK/T),$$

where K is the Nth-order diffraction efficiency of the hologram, T is the transmission factor of the hologram, and r is the reflectivity of the subject surface.

26. The inspection apparatus according to claim 14, which further comprises observing means for observing the interference fringes of the Nth-order diffracted rays of the object light and the zeroth-order diffracted rays of the reference light.

27. The inspection apparatus according to claim 26, wherein said observing means includes a screen disposed on the opposite side of the selecting means to the light dividing means.

28. The inspection apparatus according to claim 1, wherein said light dividing means includes a translucent mirror for reflecting the light beam emitted from the emitting means toward the subject surface, and a reference translucent mirror disposed between the translucent mirror and the subject surface and adapted to transmit about one-half of the light beam as an object light and to reflect the remaining half as a reference light toward the hologram.

29. The inspection apparatus according to claim 28, wherein said reference translucent mirror includes a translucent mirror surface facing the subject surface.

30. The inspection apparatus according to claim 28, wherein said optical system includes a convergent lens disposed between the translucent mirror and the reference translucent mirror and adapted to apply the light beam to the subject surface and to direct the light beam reflected by the subject surface toward the hologram.

31. The inspection apparatus according to claim 30, wherein said reference translucent mirror is located on the same side as the convergent lens with respect to the focus of the converging lens.

32. The inspection apparatus according to claim 30, wherein said reference translucent mirror is located on the same side as the subject surface with respect to the focus of the convergent lens.

33. The inspection apparatus according to claim 28, wherein said optical system includes a convergent lens disposed between the translucent mirror and the reference translucent mirror and adapted to apply the light beam to the subject surface, and a reflecting surface located on the opposite side of the subject surface to the convergent lens and adapted to reflect the light beam transmitted through the subject surface toward the hologram.

* * * * *